April 28, 1925.
E. G. DANN
1,535,581
SPRING BAR BUMPER AND SUPPORT
Filed Dec. 14, 1922
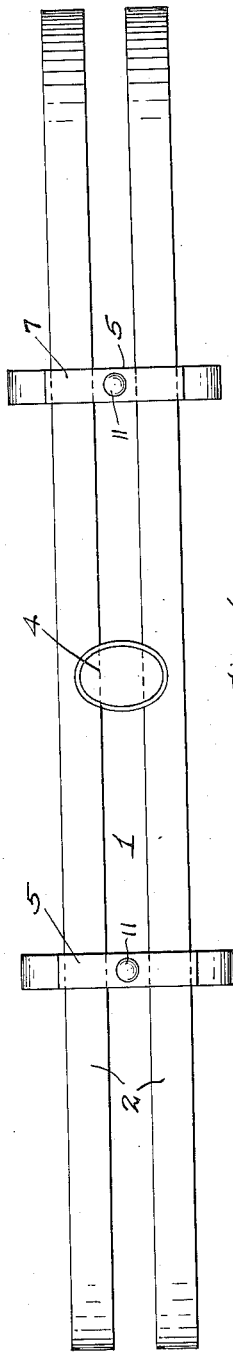
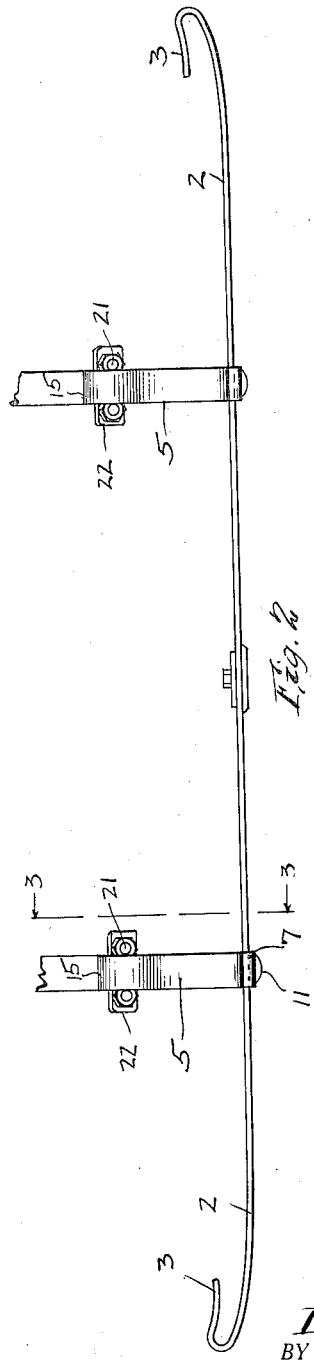
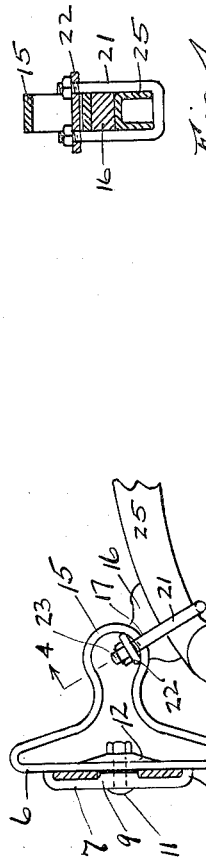
INVENTOR.
Ernest G. Dann
BY
Fay, Oberlin & Fay
ATTORNEYS Patented Apr. 28, 1925.

1,535,581

UNITED STATES PATENT OFFICE.

ERNEST G. DANN, OF CHICAGO, ILLINOIS.

SPRING-BAR BUMPER AND SUPPORT.

Application filed December 14, 1922. Serial No. 606,794.

*To all whom it may concern:*

Be it known that I, ERNEST G. DANN, a citizen of the United States, and a resident of Chicago, county of Cook, and State of Illinois, have invented a new and useful Improvement in Spring-Bar Bumpers and Supports, of which the following is a specification, the principle of the invention being herein explained, and the best mode in which I have contemplated applying that principle so as to distinguish it from other inventions.

This invention comprises a spring bumper and is of the type especially adapted for motor vehicles. More particularly it relates to a bumper wherein a plurality of spring impact elements are positioned vertically in parallel relation to each other across the front or rear of the frame of a vehicle and have resilient means for connecting them with the frame of such vehicle. The impact bars are preferably two in number and are of identical shape and are designed to be held in spaced relation to each other when inserted in the spring bracket elements. For some purposes, for example, for use on trucks or motor busses, it may be desirable to employ more than two impact bars.

Spring bumpers of light, simple construction have heretofore been designed, but such bumpers are usually single bar bumpers which afford but slight protection in the event of collision with a car having a frame positioned a greater or lesser distance from the ground, the projecting parts of such cars not infrequently passing above or below the bumper and injuring the structural parts of the car or its accessories.

The object of the present invention is to supply a bumper which will afford a maximum degree of resistance to shock with a wide area of protection and simplicity and lightness of construction. It is a further object of the invention to provide a bumper of such lateral and longitudinal extent as to fully shield a car and its accessory parts from contact with the projecting parts of cars with which it may come into collision. Other objects of the invention will appear in the course of the following description.

To the accomplishment of the foregoing and related ends, said invention, then, consists of the means hereinafter fully described and particularly pointed out in the claims.

The accompanying drawing and the following description set forth in detail certain structure embodying the invention, such disclosed means constituting, however, but one of various structural forms in which the principle of the invention may be used.

In said accompanying drawing:—

Fig. 1 is a front elevation of the improved bumper; Fig. 2 is a plan view of the bumper shown in Fig. 1; Fig. 3 is an enlarged detail side elevation of the parts shown in Fig. 2 as viewed along the line 3—3, looking in the direction of the arrows; and Fig. 4 is an enlarged detail sectional view taken along the line 4—4 shown in Fig. 3, looking in the direction of the arrows.

As is clearly shown in Figs. 1 and 2 of the drawing, the bumper 1 comprises a pair of impact bars 2 of light spring material having the respective ends 3 turned inwardly and parallel to the outer face of the bar for a short distance. The bars are preferably spaced approximately the width of a single impact bar from each other and may be united centrally by means of a plate 4 clamped or otherwise securely affixed thereto. At points midway of each half section said bars are provided with spring bracket supports 5 of approximately T-shape. The brackets are formed of loops of spring material and at their outer sides are provided with flat faces 6 against which the impact bars are firmly held by means of clip plates 7 securely bolted thereto. The flat faces of said brackets are preferably extended above and below the points of attachment for the impact bars to approximately the distance of the width of a single impact bar to provide for additional resiliency and at the same time to afford protection against bumpers on cars of higher or lower position above the ground passing above or below the bumper. The clip plates have downwardly turned ends 8 adapted to engage over the edges of the impact bars and centrally each clip plate is provided with an enlargement 9 through which an aperture is made to receive the securing bolt 11. The brackets are centrally apertured upon their front faces to receive the securing bolts and conical washers 12 may be positioned upon the inner ends of said bolts adjacent the inner faces of said brackets. The inner portions 15 of the supporting brackets are preferably of circular contour and are designed to rest upon supporting blocks 16 having upper faces 17 of concave outline to receive the said circular portions of the brackets. The parts are held in rigid adjustment to each other by means of a U-bolt 21 and a cross plate 22. The cross plate is adapted to be inserted within the curved section of the bracket and the tightening of the nuts 23, screw-threaded upon the ends of the U-bolt, serves to clamp the curved faces of the bracket in rigid engagement with the concave face of the supporting block, and to hold said block in firm contact with the end portion of the frame 25 of the vehicle.

It will be obvious that the bumper herein described may be readily constructed of light gauge material, and that, through the co-operation of the spring bar bumper sections with the enlarged loop spring bar brackets, a maximum cushioning effect for any shocks received by the bumper will be provided.

Other modes of applying the principle of my invention may be employed instead of the one explained, change being made as regards the structure herein disclosed, provided the means stated by any of the following claims or the equivalent of such stated means be employed.

I therefore particularly point out and distinctly claim as my invention:—

1. In an article of the character described, the combination of a pair of impact bars disposed in spaced parallel relation to each other and adapted to be positioned transversely of the end of a motor vehicle, a pair of brackets formed of continuous bands of spring bar material of approximately T-shape in outline, means for attaching the T-head portions of said respective brackets to the impact bars at points approximately central of the respective half-sections of said impact bars, and means located adjacent a central horizontal plane through said brackets for adjustably positioning said brackets upon the frame of a motor vehicle.

2. In an article of the character described, the combination of a pair of vertically spaced impact bars adapted to be positioned transversely of the end of a motor vehicle, a pair of enlarged loop brackets formed of continuous bands of spring bar material of approximately T-shape in outline with their T-heads disposed vertically and forwardly, clip members disposed vertically in alignment with said T-heads at points approximately central of the respective half-proximately central of the respective half-sections of said impact bars adapted to engage over and space apart said bars and hold them rigidly against the outer face of said bracket members, and means located adjacent a central horizontal plane through said brackets for adjustably positioning said brackets upon the frame of a motor vehicle.

3. A bracket for a motor vehicle bumper comprising an enlarged integrally formed loop of spring material having a flat vertically disposed forward portion, a circular section formed in said loop at the rearward central portion thereof, a block adapted to receive said rounded circular section of the loop, and means for securing said bracket and block against the frame of the vehicle.

4. A bracket for a motor vehicle bumper comprising an integrally formed continuous loop of spring material, a flat vertically disposed face formed upon said loop, a circular section formed in said loop opposite said flat face, a pair of inclined reversely curved sections connecting said circular and flat face portions thereof, and a clip member disposed parallel to said vertical portion adapted to connect the impact members to the flat face of said bracket members.

5. A bracket for a motor vehicle bumper comprising an integrally formed continuous loop of spring material, a flat face formed upon said loop and adapted to be vertically disposed, a circular section formed in said loop opposite said flat face, inclined reversely curved loop sections connecting said circular and flat face portions thereof, a clip member parallel to said vertical faces adapted to connect impact members to the straight face of said bracket members, a block adapted to receive said circular section of the loop, and means for securing said bracket and block against the frame of the vehicle.

Signed by me, this 4th day of December, 1922.

ERNEST G. DANN.